Patented Jan. 31, 1950

2,496,198

UNITED STATES PATENT OFFICE 2,496,198

PREPARATION OF ALKOXYISOBUTYRALDOXIMES

Darrel J. Butterbaugh, Abington, Pa., assignor to Rohm & Haas Company, Philadelphia, Pa., a corporation of Delaware No Drawing. Application September 17, 1947, Serial No. 774,665

7 Claims. (Cl. 260—566)

This invention relates to alkoxyisobutyraldoximes and to a method for their preparation. The present invention provides a method for preparing alkoxyisobutyraldoximes from isobutylene through reaction thereof with nitrosyl chloride to form an addition product which is reacted with a lower primary aliphatic alcohol and a potentially or mildly alkaline inorganic reagent to give the desired alkoxyisobutyraldoxime.

When nitrosyl chloride is added to isobutylene, preferably at temperatures below about 30° C., a white solid is formed which, upon analysis, appears as a dimer of the adduct of isobutylene and nitrosyl chloride in equimolecular proportions. This dimer may be formed in the absence or presence of an organic solvent. Low-boiling naphthas are particularly suitable solvents for the reaction, as the dimer readily precipitates therefrom as formed and is readily separated in a practically pure form.

When the dimer is mixed with a lower aliphatic primary alcohol and an inorganic compound which is either practically neutral or but mildly alkaline and which has a capacity for absorbing or neutralizing a strong acid, an alkoxy group is introduced into the molecule in place of the chlorine atom of the dimer and a rearrangement occurs. The resulting product is an oxime.

As an alcohol, there may be used any of the lower primary aliphatic alcohols, particularly the saturated alcohols, including methyl, ethyl, propyl, or butyl. The unsaturated alcohols, such as allyl and methallyl, also react although, rather surprisingly, somewhat sluggishly.

As an inorganic compound which is free from marked alkalinity, but which is capable of taking up strong acids, there may be cited the carbonates of the alkaline earth metals, such as calcium carbonate, strontium caronate, barium carbonate, magnesium carbonate, basic magnesium carbonate, and the like, and the bicarbonates of the alkali metals, particularly sodium and potassium bicarbonate. Other carbonates and bicarbonates which are not more than mildly alkaline may be used. Similarly, alkali metal salts of weak inorganic acids maybe used, such as disodium or dipotassium phosphate, or other monohydrogen phosphate of the alkali metals, borax, and the like, which do not give strongly alkaline aqueous solutions.

By the preferred method, the dimer, alcohol, and inorganic acid-absorbing compound are mixed and the mixture maintained at about 40° to 120° C., preferably with cooling. The reaction may desirably be carried out in an excess of the selected alcohol and the temperature of the reaction carried up to that obtained under reflux conditions. The salts formed are then separated and the desired oxime concentrated or purified by distillation or equivalent operation.

The invention is illustrated by the following typical preparations of alkoxyisobutyraldoximes.

Example 1

Into isobutylene dissolved in petroleum ether and maintained at 0° to 5° C., there was run nitrosyl chloride. A white solid formed and was filtered off.

A portion of 121.5 grams of this solid, the dimer of the adduct of isobutylene and nitrosyl chloride, was added to about 320 grams of pure methyl alcohol and the resulting mixture warmed to 40° C. About 170 grams of powdered sodium bicarbonate was added thereto. Carbon dioxide was evolved. After two and a quarter hours, 90% of the theoretical amount of gas had been collected. Thereupon, the reaction mixture was heated to the reflux temperature and then cooled. The sodium chloride and remaining bicarbonate were filtered off. The filtrate was subjected to fractional distillation at reduced pressure. When most of the excess methanol had been removed, pressure was reduced to 15 mm. and a small forecut taken off. The main fraction distilled at 80°–88° C./15 mm. This distillate was crystallized to give crystals melting at 43°–44° C. after recrystallization from petroleum ether. The yield was 81%. Analysis showed 11.81% of nitrogen, 51.2% of carbon, and 9.28% of hydrogen, compared with the theoretical values for $(CH_3)_2C(OCH_3)HC=NOH$ of 11.95%, 51.2%, and 9.4%, respectively. The compound reacts with concentrated hydrochloric acid to give the hydroxylamine hydrochloride. It decomposes with concentrated sulfuric or phosphoric acid and with phosphorus pentoxide decomposes to give HCN.

Example 2

The procedure of Example 1 was followed, except that the entire reaction was conducted under reflux and the time accordingly shortened to thirty minutes. The yield was 78%.

Example 3

The procedure of Example 1 was followed, except that disodium phosphate was used in place of sodium bicarbonate. The yield was about 78%.

Example 4

The procedure of Example 1 was again followed, except that borax was used. The yield was better than 70%.

Example 5

A mixture of 122 grams of the dimer from isobutylene and nitrosyl chloride was made in methanol and crushed marble added thereto with stirring. The reaction mixture was heated under reflux for two and a half hours. The excess methanol was stripped off, benzene was added as a solvent, and the calcium chloride which had been formed was taken up in a little water and removed. The benzene solution was fractionally distilled. The yield was 88% of methoxyisobutyraldehyde oxime.

Example 6

The procedure of Example 5 was followed with the replacement of the crushed marble by precipitated calcium carbonate. A yield of about 84% was obtained.

Example 7

The procedure of Example 5 was followed, but magnesium carbonate was used in place of calcium carbonate with approximately the same results.

Example 8

A suspension of 122 grams of the isobutylene-nitrosyl chloride dimer was made in 460 grams of absolute ethyl alcohol. Thereto was added 170 grams of sodium bicarbonate and the reaction mixture heated under reflux until carbon dioxide was no longer evolved. The reaction mixture was cooled and filtered. The filtrate was heated under reduced pressure. After the excess ethanol and a small forecut had been taken, the main fraction was obtained at 79°–80° C. at 8 to 9 mm. The product formed crystals melting at 38°–39° C. The analysis of this product corresponded to $(CH_3)_2(C_2H_5O)C-CH=NOH$ (percentage of nitrogen found, 10.5; theory, 10.7%). The value of the refractive index, $n_D^{20}$, is 1.4407.

Example 9

The procedure of Example 8 was followed except that n-propanol was substituted for the ethanol. The main fraction was distilled at 89°–90° C. at 8 to 9 mm. pressure. The analysis of this product corresponded to that of $(CH_3)_2(C_3H_7O)C-CH=NOH$ (percentage of nitrogen found, 9.4; theory, 9.6%). The value of the refractive index, $n_D^{20}$, is 1.4417.

The above alcohol may be replaced with butyl alcohol. The isolation of the alkyloxyisobutyraldoximes from these alcohols and the dimer requires distillation at low pressures, since the products cannot be heated much above 100°–120° C. without considerable decomposition.

In place of the nitrosyl chloride products used above, there may be used the corresponding products obtained from nitrosyl bromide.

Dehydration of the alkoxyisobutyraldoximes leads to the corresponding alkoxyisobutyronitriles, which are useful for preparation of corresponding amines by reduction on the one hand, or, on the other, for preparation through hydrolysis of alkoxyisobutyric acid and its derivatives, including its esters. The alkoxyisobutyraldoximes react with various unsaturated compounds to form oximino ethers. They are, therefore, versatile intermediates for producing a great variety of other new chemical compounds. Hence, the preparation of alkoxyisobutyraldoximes is a very valuable one.

I claim:

1. A process for preparing alkoxyisobutyraldoximes which comprises reacting the dimeric addition product of isobutylene and a nitrosyl halide with a primary alcohol of one to four carbon atoms in the presence of an inorganic compound which is approximately neutral but which has capacity for neutralizing a strong acid from the group consisting of carbonates of the alkaline earth metals, bicarbonates of the alkali metals, monohydrogen phosphates of the alkali metals, and borax.

2. A process for preparing alkoxyisobutyraldoximes which comprises reacting the dimeric addition product of isobutylene and nitrosyl chloride with a saturated primary alcohol of one to four carbon atoms in the presence of an inorganic reagent which is not markedly alkaline but which neutralizes strong acids from the group consisting of carbonates of the alkaline earth metals, bicarbonates of the alkali metals, monohydrogen phosphates of the alkali metals, and borax.

3. A process for preparing alkoxyisobutyraldoximes which comprises reacting the dimeric addition product of isobutylene and nitrosyl chloride with a saturated primary alcohol of one to four carbon atoms in the presence of a carbonate of an alkaline earth metal.

4. A process for preparing alkoxyisobutyraldoximes which comprises reacting the dimeric addition product of isobutylene and nitrosyl chloride with a saturated primary alcohol of one to four carbon atoms in the presence of a bicarbonate of an alkali metal.

5. A process of preparing methoxyisobutyraldoxime which comprises reacting the dimeric addition product of isobutylene and nitrosyl chloride with methyl alcohol in the presence of an inorganic compound which is approximately neutral but which has capacity for neutralizing a strong acid from the group consisting of carbonates of the alkaline earth metals, bicarbonates of the alkali metals, monohydrogen phosphates of the alkali metals, and borax.

6. The process of claim 5 in which the inorganic compound is sodium bicarbonate.

7. The process of claim 5 in which the inorganic compound is calcium carbonate.

DARREL J. BUTTERBAUGH.

REFERENCES CITED

The following references are of record in the file of this patent:

UNITED STATES PATENTS

| Number | Name | Date |
| --- | --- | --- |
| 1,459,177 | Carter | June 19, 1923 |
| 2,223,181 | Miller et al. | Nov. 26, 1940 |
| 2,265,993 | Beckham | Dec. 16, 1941 |
| 2,370,518 | Beekhuis | Feb. 27, 1945 |
| 2,382,031 | Soday | Aug. 14, 1945 |
| 2,394,430 | Crowder et al. | Feb. 5, 1946 |
| 2,435,570 | Beckham | Feb. 10, 1948 |

OTHER REFERENCES

Tilden et al.: "J. Chem. Soc." (London), 1894, vol. 65, page 325.

Drew et al.: "J. Chem. Soc." (London), 1934, page 49 and page 50.